US 6,570,636 B2

(12) United States Patent
Kim et al.

(10) Patent No.: US 6,570,636 B2
(45) Date of Patent: *May 27, 2003

(54) VERTICALLY ALIGNED LIQUID CRYSTAL DISPLAY

(75) Inventors: Jae-Hoon Kim, Yongin (KR); Jang-Kun Song, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/161,602

(22) Filed: Jun. 5, 2002

(65) Prior Publication Data

US 2002/0180921 A1 Dec. 5, 2002

Related U.S. Application Data

(63) Continuation of application No. 09/910,128, filed on Jul. 23, 2001.

(30) Foreign Application Priority Data

Jul. 27, 2000 (KR) .......................................... 2000-43507

(51) Int. Cl.[7] .............................................. G02F 1/1337
(52) U.S. Cl. ........................ 349/130; 349/122; 349/123; 349/129
(58) Field of Search ................................. 349/129, 130, 349/122, 123, 143

(56) References Cited

U.S. PATENT DOCUMENTS

| 6,081,315 | A | | 6/2000 | Matsuyama et al. |
| 6,100,953 | A | | 8/2000 | Kim et al. |
| 6,424,396 | B1 | * | 7/2002 | Kim et al. .................. 349/130 |

* cited by examiner

Primary Examiner—Robert H. Kim
Assistant Examiner—David Chung
(74) Attorney, Agent, or Firm—McGuireWoods LLP; Hae-Chan Park

(57) ABSTRACT

Disclosed is a liquid crystal display comprising a first substrate made of an insulating material; pixel electrodes formed on the first substrate, the pixel electrodes having a first aperture pattern; a second substrate made of an insulating material and provided opposing the first substrate at a predetermined distance; a common electrode formed on the second substrate, the common electrode having a second aperture pattern; and a liquid crystal layer made of liquid crystal material that is injected between the first and second substrates, wherein either or both of the pixel electrodes and the common electrode include stepped portions that protrude a predetermined distance away from the substrates, between apertures of the first and/or second aperture patterns.

7 Claims, 2 Drawing Sheets

Present invention | Prior art

VERTICALLY ALIGNED LIQUID CRYSTAL DISPLAY

CROSS REFERENCE TO RELATED APPLICATIONS

This application is a continuation application of Applicant's U.S. application Ser. No. 09/901,128 filed on Jul. 10, 2001 now U.S. Pat. No. 6,424,396.

BACKGROUND OF THE INVENTION (a) Field of the Invention

The present invention relates to a vertically aligned liquid crystal display, and more particularly, to a vertically aligned liquid crystal display having a aperture pattern formed in electrodes to obtain a wide viewing angle.

(b) Description of the Related Art

A liquid crystal display (LCD) is structured having liquid crystal injected between an upper substrate having a common electrode and a color filter, and a lower substrate having thin film transistors and pixel electrodes. A voltage of a different potential is applied to the pixel electrodes and common electrode to form an electric field, thereby varying the alignment of liquid crystal molecules of the liquid crystal material. In this way, the transmittance of incident light is controlled to display images.

In a vertically aligned (VA) LCD, long axes of the liquid crystal molecules align themselves vertically to the substrates in a state where no electric field is formed between the substrates. The VALCD has a high contrast ratio and a wide viewing angle such that this LCD configuration is the most commonly used type of liquid crystal display.

In one method to obtain a wide viewing angle in the VA LCD, aperture patterns are formed in the electrodes. With this configuration, a fringe field is used to uniformly scatter a slanting direction of the liquid crystal molecules into four directions to achieve a wide viewing angle. A conventional VA LCD, having aperture patterns formed in the electrodes to obtain a wide viewing angle, will now be described with reference to FIG. 1.

FIG. 1 shows a partial sectional view of a conventional VA LCD having aperture patterns formed in electrodes.

A pixel electrode 110 is formed on an insulating lower substrate 100, and a common electrode 210 is formed on an insulating upper substrate 200. Aperture patterns are formed in the pixel electrode 110 and the common electrode 210. Apertures of the aperture pattern of the pixel electrode 110 are provided alternately with apertures of the aperture pattern of the common electrode 210. Further, liquid crystal material is injected between the substrates 100 and 200 to form a liquid crystal layer 300.

As shown in the drawing, a fringe field generated by the aperture patterns uniformly controls a slanting direction of liquid crystal molecules of the liquid crystal layer 300. A wide viewing angle is realized as a result. However, at center portions between apertures of the upper substrate 200 and the lower substrate 100, weak fringe field forms an area by the vertical electric field with respect to the substrates where the liquid crystal molecules do not quickly change alignments by the electrical field. Also, the liquid crystal molecules in these areas begin to slant only after liquid crystal molecules in the vicinity of the aperture patterns are slanted. This slows down the response speed of the LCD.

SUMMARY OF THE INVENTION

The present invention has been made in an effort to solve the above problems.

It is an object of the present invention to provide a vertically aligned liquid crystal display in which a lower and an upper aperture pattern are formed in electrodes of at least one substrate to form a stepped pattern at the center of the aperture pattern. Accordingly, a response speed is improved.

To achieve the above object, the present invention provides a liquid crystal display comprising a first substrate made of an insulating material; pixel electrodes formed on the first substrate, the pixel electrodes having a first aperture pattern; a second substrate made of an insulating material and provided opposing the first substrate at a predetermined distance; a common electrode formed on the second substrate, the common electrode having a second aperture pattern; and a liquid crystal layer made of liquid crystal material injected between the first substrate and the second substrate, wherein either or both of the pixel electrodes and the common electrode include stepped portions, which protrude a predetermined distance away from the substrates, between apertures of the first and/or second aperture pattern.

According to a feature of the present invention, the pixel electrodes include the stepped portions.

According to another feature of the present invention, the stepped portions are formed by providing the pixel electrodes over a gate insulation layer and a protection layer.

According to yet another feature of the present invention, the common electrode includes the stepped portions.

According to still yet another feature of the present invention, the pixel electrodes include first stepped portions and the common electrode includes second stepped portions.

According to still yet another feature of the present invention, the first stepped portions and the second stepped portions are provided in a sequence of the first aperture pattern, the second stepped portions, the first stepped portions, and the second aperture pattern.

According to still yet another feature of the present invention, the liquid crystal display further comprises thin film transistors formed on the first substrate, the thin film transistors switching image signals transmitted to the pixel electrodes.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
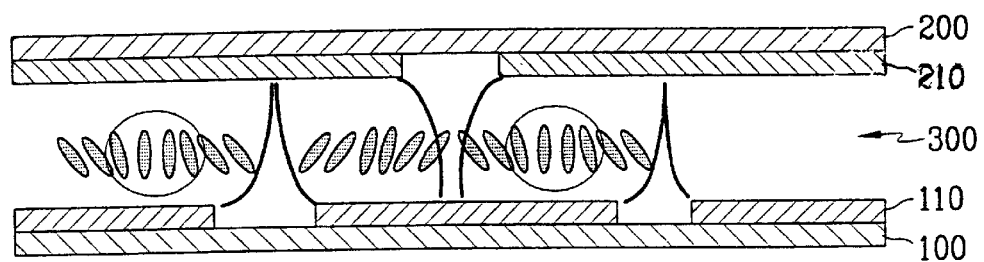
FIG. 1 is a partial sectional view of a conventional vertically aligned liquid crystal display.
Figure 2:
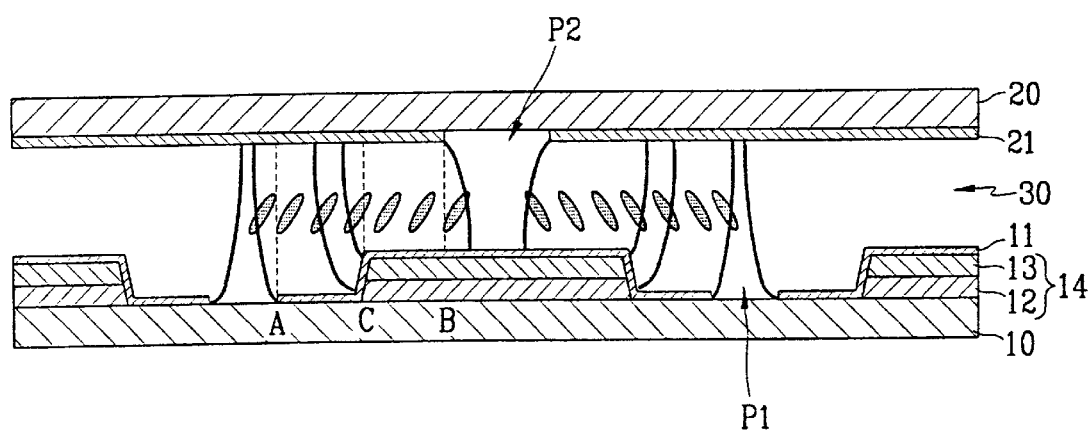
FIG. 2 is a partial sectional view of a vertically aligned liquid crystal display according to a first preferred embodiment of the present invention.

FIG. 2 shows a partial sectional view of a vertically aligned liquid crystal display according to a first preferred embodiment of the present invention.

A pixel electrode 11 is formed on a lower substrate 10, the lower substrate 10 being made of an insulating material such as glass, and a common electrode 21 is formed on an upper substrate 20, which is also made of an insulating material. A first aperture pattern P1 and a second aperture pattern P2 are formed respectively in the pixel electrode 11 and the common electrode 21. Apertures of the first aperture pattern P1 are provided alternately with apertures of the second aperture pattern P2. Plateaus 14 are formed on the lower substrate 10. The pixel electrode 11 is formed over the plateaus 14 such that stepped portions are formed. The plateaus 14 are formed by a gate insulating layer 12 and a protection layer 13.

The stepped portions start at roughly a center between an edge A of the apertures of the first aperture pattern P1 and an edge B of the apertures of the second aperture pattern P2, that is at areas C. Since a fringe field is also formed by the stepped portions, the liquid crystal molecules positioned over areas C quickly respond to a generated electric field.

In a liquid crystal display, many more elements than those described above are provided on the lower and upper substrates 10 and 20. For example, additionally provided on the lower substrate 10 are gate wiring, data wiring, and thin film transistors, and additionally provided on the upper substrate 20 are a color filter and a black matrix. The gate wiring transmits scanning signals, the data wiring transmits image signals, and the thin film transistors act as a switching element to either transmit or cut off the image signals to the pixel electrode 11 according to the scanning signals. These elements do not appear in the drawing to simplify the explanation of the first embodiment.

Figure 3:
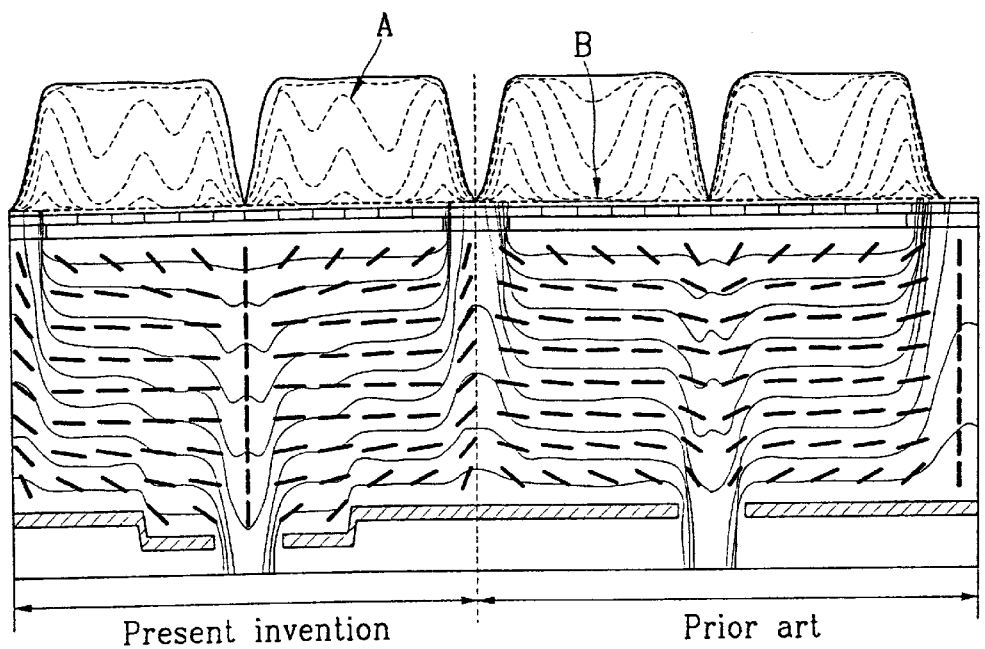
FIG. 3 is a combination sectional view and transmissivity graph comparing the vertically aligned liquid crystal display of the first preferred embodiment of the present invention with a conventional vertically aligned liquid crystal display.

FIG. 3 shows a combined sectional view and transmissivity graph comparing the vertically aligned liquid crystal display of the first preferred embodiment of the present invention with a conventional vertically aligned liquid crystal display.

In FIG. 3, it is to be assumed that a drive voltage be applied after a threshold voltage of 1.7 V is applied for 150 msec. Shapes of equipotential lines and alignment of liquid crystal molecules are shown in the lower part of FIG. 3, while the curved lines of the upper part of FIG. 3 are transmissivity curves, in which the changes are with respect to time.

As shown by area B of the conventional LCD, in which no stepped portion is provided, light transmissivity slowly decreases with time at areas between the apertures of the aperture patterns. On the other hand, in the present invention having stepped portions, the liquid crystal molecules at areas between the apertures of the aperture patterns are aligned simultaneously with the liquid crystal molecules at edges of the apertures as a result of the transformed electric field due to the stepped portions. Accordingly, with reference to area A, a light transmissivity is nearly identical throughout the liquid crystal display of the present invention, thereby enhancing response speed.

Table 1 below shows a comparison between response speeds of the conventional LCD and the LCD of the present invention at different gray levels.

TABLE 1

| Starting voltage (V) | Applied voltage (V) | Prior art (ms) | Present invention (ms) | Difference in time (ms) |
|---|---|---|---|---|
| 1.7 | 2.5 | 147 | 123 | 24 |
|  | 3.0 | 80 | 64 | 16 |
|  | 3.5 | 47 | 38 | 9 |
|  | 4.0 | 32 | 25 | 7 |
|  | 5.0 | 16 | 13 | 3 |
| 2.0 | 2.5 | 120 | 100 | 20 |
|  | 3.0 | 67 | 58 | 10 |
| Average |  | 72.7 | 60.14 | 12.56 |

As shown in Table 1, the present invention has a response speed at all gray levels that is faster than the conventional LCD. Of particular interest is the improvement in response speed of between 20 and 25 ms at low gray levels.

Figure 4:
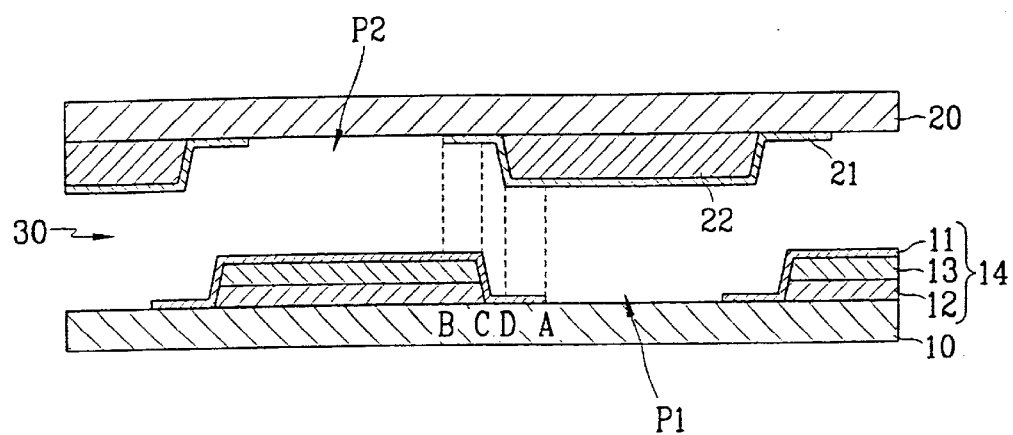
FIG. 4 is a partial sectional view of a vertically aligned liquid crystal display according to a second preferred embodiment of the present invention.

FIG. 4 shows a partial sectional view of a vertically aligned liquid crystal display according to a second preferred embodiment of the present invention.

A pixel electrode 11 is formed on a lower substrate 10, the lower substrate 10 being made of an insulating material such as glass, and a common electrode 21 is formed on an upper substrate 20, which is also made of an insulating material. A first aperture pattern P1 and a second aperture pattern P2 are formed respectively in the pixel electrode 11 and the common electrode 21. Apertures of the first aperture pattern P1 are provided alternatingly with apertures of the second aperture pattern P2. Plateaus 14 are formed between the pixel electrode 11 and the lower substrate 10, and plateaus 22 are formed between the common electrode 21 and the upper substrate 20. As a result, stepped portions are formed on the lower and upper substrates 10 and 20. The plateaus 14 of the lower substrate 10 are formed of a gate insulating layer 12 and a protection layer 13.

The stepped portions of the lower substrate 10 and the upper substrates 20 start at a center area between an edge A of the apertures of the first aperture pattern P1 and an edge B of the apertures of the second aperture pattern P2. That is, areas C, at which point the stepped portions of the lower substrate 10 begin to form, are misaligned with areas D, at which point the stepped portions of the upper substrate 20 begin to form.

By forming the stepped portions also on the upper substrate 20, the further increased effects of varying the electric field improve the response speed.

In the LCDs of the present invention described above, stepped portions are formed only on the lower substrate and on both the upper and lower substrates. However, it is also possible to form protruding areas only on the upper substrate. A detailed description of such a configuration will be omitted, as such modifications will be well known to one of ordinary skill in the art.

In the present invention, the response speed of the liquid crystal display is improved by forming stepped portions between apertures of the lower substrate and the upper substrate. That is, by the transformed electric field resulting from the stepped portions, the slanting direction of the liquid crystal molecules is better controlled in areas between the apertures to enhance the overall response speed.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A liquid crystal display, comprising:

a first substrate made of an insulating material;

pixel electrodes formed on said first substrate;

a second substrate made of an insulating material and facing said first substrate at a predetermined distance;

a common electrode formed on said second substrate; and a liquid crystal layer made of liquid crystal material injected between said first substrate and said second substrate, wherein at least one of said pixel electrodes and said common electrode includes a stepped portion, which protrudes a predetermined distance away from the substrates, and wherein at least one of said pixel electrodes and said common electrode includes an aperture pattern.

2. The liquid crystal display of claim 1, wherein said pixel electrodes include he stepped portion.

3. The liquid crystal display of claim 2, wherein the stepped portion is formed by providing the pixel electrodes over a gate insulation layer and a protection layer.

4. The liquid crystal display of claim 1, wherein said common electrode includes the stepped portion.

5. The liquid crystal display of claim 1, wherein said pixel electrodes include a first stepped portion and said common electrode includes a second stepped portion.

6. The liquid crystal display of claim 5, wherein the first stepped portion and the second stepped portion are provided in a sequence of the first aperture pattern, the second stepped portion, the first stepped portion, and the second aperture pattern.

7. The liquid crystal display of claim 1, further comprising a thin film transistor formed on said first substrate, Ale thin film transistor switching image signals transmitted to the pixel electrode.

* * * * *

UNITED STATES PATENT AND TRADEMARK OFFICE
CERTIFICATE OF CORRECTION

PATENT NO. : 6,570,636 B2  Page 1 of 1
DATED : May 27, 2003
INVENTOR(S) : Jae-Hoon Kim et al.

It is certified that error appears in the above-identified patent and that said Letters Patent is hereby corrected as shown below:

<u>Title page,</u>
Item [63], Related U.S. Application Data, change "09/910,128" to -- 09/901,128 --.
Change "July 23, 2001" to -- July 10, 2001 --.

Signed and Sealed this

Fourteenth Day of October, 2003

JAMES E. ROGAN
*Director of the United States Patent and Trademark Office*